Oct. 2, 1951  H. B. LARSEN  2,570,034
MAGNETIC RAIL BRAKE
Filed Oct. 23, 1945  2 Sheets-Sheet 1

Inventor
H. B. Larsen
By Glascock & Downing Seeley Co
Attys

Oct. 2, 1951 H. B. LARSEN 2,570,034
MAGNETIC RAIL BRAKE
Filed Oct. 23, 1945 2 Sheets-Sheet 2

Inventor
H.B.Larsen
By Leonard Downing Huckle
Attys.

Patented Oct. 2, 1951

2,570,034

UNITED STATES PATENT OFFICE 2,570,034

MAGNETIC RAIL BRAKE

Hans Breien Larsen, Stockholm, Sweden

Application October 23, 1945, Serial No. 623,945
In Sweden October 28, 1944

3 Claims. (Cl. 188—165)

This invention relates to the mounting of electro-magnetic track brakes on the trucks of railway cars.

One difficulty with the hitherto known mounting arrangements of track brakes is that the track brake touches the rail only with the longitudinal edge of one of the pole pieces.

An object of the present invention is to provide a mounting arrangement for electro-magnetic track brakes wherein the brake is suspended by a resilient mounting in longitudinal alignment with the rail.

Another object of the present invention is to provide a mounting arrangement for electro-magnetic track brakes wherein the brake is slidably mounted in alignment with the rail for reciprocable movement into and out of engagement with the rail.

A further object of the present invention is to provide a mounting arrangement for electro-magnetic track brakes wherein the brake is pivotally mounted for oscillation about a longitudinal axis parallel to the surface of the rail.

An additional object of the present invention is to provide a mounting arrangement for electro-magnetic track brakes wherein the brake is pivotally mounted for oscillation about a longitudinal axis in close proximity to the surface of the rail.

Still other objects, advantages, and improvements will become apparent from the following specification, taken in connection with the accompanying drawings, wherein.

Figure 1:
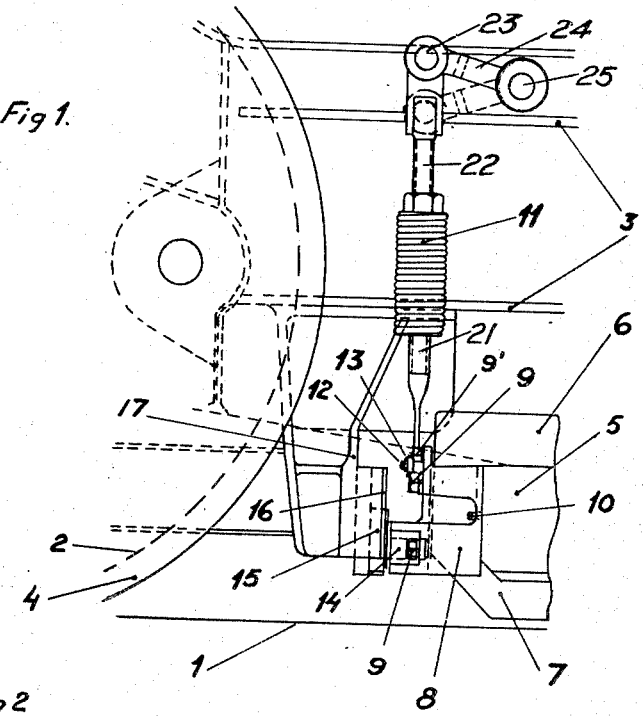
Figure 1 is a side elevation view of the lower forward part of the truck of a railroad car showing the mounting arrangement for electro-magnetic track brakes according to the present invention thereon.
Figure 2:
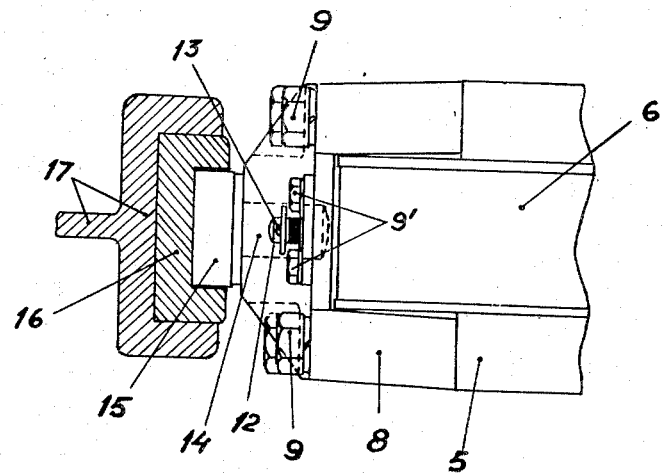
Figure 2 is a top plan view, partly in section, of the mounting arrangement shown in Figure 1; and, Figure 3 is an end elevation view of the electro-magnetic brake element.

Referring now to the drawings in detail and to Figures 1 and 2 in particular, the frame of one truck is here shown including longitudinally positioned members having flanges 3 thereon. Wheels having cylindrical running surfaces 2 and flanges 3 are rotatably mounted on axles (not shown) on the trucks. The electro-magnetic brakes, according to the present invention, are mounted on each side of the truck intermediate the front wheel and the rear wheel (not shown). The electro-magnetic brake is here shown as comprised by a body 5 in which the coils (not shown) are mounted, an iron yoke 6, a pair of downwardly extending pole pieces 7—7, which latter are adapted to contact the surface of the rail 1, and end pieces 8. The end pieces 8 are secured to the body 5 by a plurality of longitudinally extending bolts 9 positioned at the corners of a quadrangle and pairs of longitudinally positioned centrally positioned pins 10—10. It is preferable that the end pieces 8 be made of some non-magnetic metal, such as brass, so as to avoid the shunting of the electro-magnetic flux lines between the opposite sides of the pole pieces.

The vertical suspension of the electro-magnetic brake is provided by a pair of aligned rods 21—22 which are adjustably connected by a compression spring 11. The lower rod 21 is pivotally connected by a pin 12 to the body 5 of the electro-magnetic brake, a cotter pin 13 being positioned diametrically through a suitable hole in the pin 12 to hold the lower end of the rod 21 in place. A wear plate 20 is positioned intermediate the lower end of the rod 21 and the body 5 of the electro-magnetic brake and is held in position by a plurality of bolts 9'. The upper end of the upper rocker arm 22 is pivotally secured at 23 to a rocker arm 24, which in turn is pivotally secured to the truck at 25.

A cylindrical pivot block 15 has a hub 14 which is received in a bore in the end piece 8 of the body 5 of the electro-magnetic brake, as by a force-fit. The cylindrical pivot block 15 is itself received in a bore in a slide block 16. A frame member 17 extends downwardly and outwardly from the lower flange member 3 of the truck chassis and terminates in a vertically positioned end of channel formation in which the slide block 16 is received.

It will be understood that there is a second wheel (not shown) on the chassis 3 to the rear of and in alignment with the wheel 2—4 and that all structure above described, except for the body 5 and iron yoke 6, is duplicated between the opposite end of the body 5 and iron yoke 6 and the second wheel.

Figure 3:
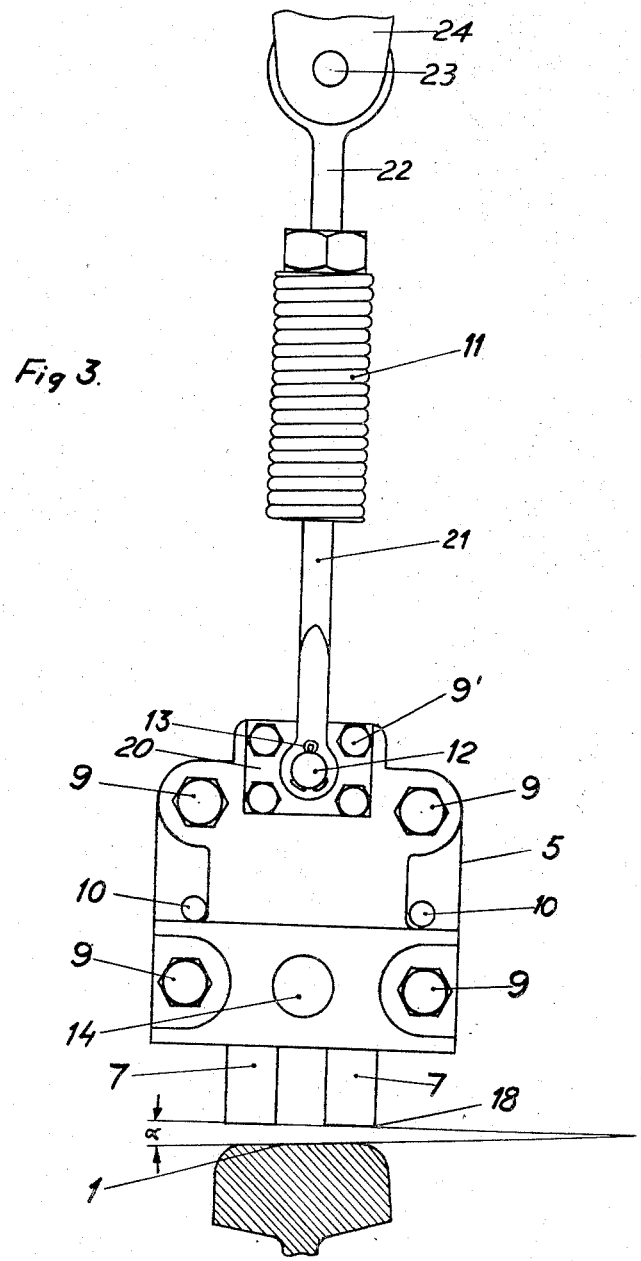

The vertically slidable mounting of the pivots 15—15 in the ends of the frame members 17—17 provides for adjustment through the vertical suspension 21—11—22 to position the body 5 of the electro-magnetic brake closer to the top of the rail as the running surfaces 2 of the wheels wear down or are reduced in diameter by being machined to true flat surfaces. Due to the pivot points 12—12 for the vertical rods being positioned above the pivots 15—15 for the body 5 of the electro-magnetic brake, there is provided a suspension of the electro-magnetic brake which is more stable when the latter is in the inactive position, that is, when the electro-magnetic brake is in the raised position, this two point support preventing lateral oscillations of same. In the course of prolonged use it is well known that rails wear so that the inner edge of the top is at an angle, such as a (Fig. 3) with a horizontal plane across the outer edge. In present known mountings, wherein the electro-magnetic brakes are merely positioned for up and down movement in a vertical plane with respect to the rail, one pole piece 7 may contact the rail while the other pole piece is positioned with an air gap between same and the rail surface, or even off the rail entirely. Such imperfect contact between the pole pieces and the rail surface obviously weakens the gripping action of the electro-magnetic brake. This defect is avoided according to the present invention wherein the downwardly and outwardly extending frame members 17—17 provide for positioning of the body 5 of the electro-magnetic brake in alignment with and close proximity to the rail and the pivots 15—15 provide for limited rotation of the body 5 of the electro-magnetic brake so as to allow both pole pieces 7—7 to come into contact with the top surface of the rail 1.

Having now fully described my invention, what I claim as new and useful and desire to secure by Letters Patent of the United States is:

1. In an electromagnetic rail brake for vehicles having a truck, a horizontally disposed body thereon, braking pole pieces arranged side by side throughout the length of the said body and carried by the same so as to extend in parallel relationship longitudinally of the said body and of the rail, pivot members arranged on the ends of the said body having a common longitudinal axis which is spaced below the center of mass of the said body, said pivot members allowing the body to swing around the said longitudinal axis, additional pivot members on the ends of the body and spaced above the first pivot members, yieldable suspension means attached to the additional pivot members, attachments for the said yieldable members on the truck so as to hold the body in its raised position above the rail when the brake is inactive, and so as to allow the brake body to be drawn against the rail when the brake is active, and vertical guide members attached to the said truck engaging the said first mentioned pivot members so as to guide the brake body and to convey the braking forces to the truck.

2. In a track brake for use on railway cars having wheel mounting trucks, a pair of longitudinally spaced guide members on the truck and aligned with the rail over which the car travels, a brake member comprised in part by an elongated yoke member positioned between said guide members, slidable blocks mounted in said guide members for vertical movement and pivots secured in said blocks and in the elongated yoke member below the longitudinal axis thereof.

3. In a track brake for use on railway cars having wheel mounting trucks, a pair of longitudinally spaced guide members on the truck and aligned with the rail over which the car travels, a brake member comprised in part by an elongated yoke member positioned between said guide members, slidable blocks mounted in said guide members for vertical movement, pivots secured in said blocks and in the elongated yoke member below the longitudinal axis thereof, and suspension rods having tension springs incorporated therein secured at both ends of said elongated yoke member, each suspension rod being pivotally secured at its upper end to the truck and pivotally secured at its lower end to one end of the elongated yoke member.

HANS BREIEN LARSEN.

REFERENCES CITED

The following references are of record in the file of this patent:

UNITED STATES PATENTS

| Number | Name | Date |
|---|---|---|
| Re. 11,786 | Newell | Nov. 7, 1899 |
| 290,689 | Kampfe | Dec. 25, 1883 |
| 1,824,043 | Farmer | Sept. 22, 1931 |
| 2,054,716 | Stedefeld et al. | Sept. 15, 1936 |
| 2,096,486 | Farmer | Oct. 19, 1937 |
| 2,207,295 | Latshaw | July 9, 1940 |

FOREIGN PATENTS

| Number | Country | Date |
|---|---|---|
| 15,816 | Great Britain | 1899 |
| 6,295 | Great Britain | 1902 |
| 28,306 | Great Britain | 1906 |